Patented Oct. 20, 1942

2,299,142

UNITED STATES PATENT OFFICE 2,299,142

VAT DYESTUFFS AND PROCESS OF PREPARING SAME

Hermann Hauser, Binningen, and Max Bommer, Riehen, Switzerland, assignors to the firm Society of Chemical Industry in Basle, Basel, Switzerland No Drawing. Application July 17, 1939, Serial No. 284,966. In Switzerland July 20, 1938

3 Claims. (Cl. 260—368)

According to this invention valuable vat-dyestuffs are made by causing 1 mol of a compound of the general formula

in which R stands for an anthraquinone radical and $x$ and $z$ stand for halogen-atoms or amino-groups which are in ortho-position to $y$, which stands for a substituent, to react with 2 mols of an amino or halogen compound which contains a group capable of being vatted, that is to say the radical of a compound capable of being vatted.

Examples of compounds of the above general formula, in which $y$ preferably stands for a substituent which under the prevailing reaction conditions does not take part in the reaction, such as alkyl, aryl, alkoxy, cyanogen or fluorine, are the 1:3 - dichloro - 2 - methylanthraquinone, 1:3-di-dihalogen-2-alkoxy-anthraquinones in which the halogen may be for example chlorine or bromine, the alkyl may belong to the lower aliphatic series and may be for example methyl or ethyl and the alkoxy may also belong to the lower aliphatic series and may be for example methoxy or ethoxy. Thus such compounds are for example 1:3- dichloro - 2 - methylanthraquinone, 1:3- dibromo-2-ethoxyanthraquinone and 1:3-dibromo-2-methoxyanthraquinone. These compounds may also contain further substituents, for instance acylamino, alkoxy or alkyl groups in 5- or 8-position. Compounds of the above general formula are for example also 1:3-diamino-2-alkyl - anthraquinones and 1:3 - diamino - 2 - alkoxy-anthraquinones.

Examples of amino or halogen compounds containing groups capable of being vatted, of which 2 mols are caused to react with 1 mol of a compound of the general formula are aminoanthraquinones and halogen anthraquinones in which the amino-group or halogen may be in 1- or 2-position; in addition to the halogen or amino-group which enters into reaction they may contain further substituents such as halogen, nitro-, alkoxy- or alkyl-groups and in particular acylamino-groups in which the acyl radical may be for example the radical of an aliphatic, aromatic or heterocyclic acid. As amino or halogen compounds capable of being vatted and containing acylamino-groups there may be named for example 1-amino- or 1-halogen-4-benzoylamino-anthraquinones, 1-amino- or 1-halogen-5-benzoylamino-anthraquinones, 1-amino- or 1-halogen-8-benzoylamino - anthraquinones, 1 - amino-5:8-dibenzoylamino-anthraquinones and 1-amino-5-methoxy - 8 - benzoylamino-anthraquinones; all these benzoylamino compounds may contain substituents, such as halogen, alkyl- or alkoxy-groups, in the benzoyl radical.

To the amino- or halogen compounds containing groups capable of being vatted belong also those amino- or halogen-compounds in which the 1- and 9-positions are members of a heterocyclic ring, for example a pyrazole or pyrimidine ring, or in which the 1- and 2-positions are members of a ring, for example an acridone ring. To these compounds also belong those with more highly condensed ring systems, for example halogen or amino substitution products of pyranthrones, pyrenequinones, anthanthrones and indanthrenes.

The reaction of 1 mol of a compound of the above general formula with 2 mols of an amino- or halogen-compound containing a group capable of being vatted, or with 1 mol of each of two such compounds, is conducted at a raised temperature, advantageously in presence of a solvent or diluent, for example nitrobenzene, naphthalene or dichlorobenzene, and advantageously in presence of an acid binding agent, for example an alkali carbonate or sodium acetate, and of an additional substance which promotes the reaction, for example copper or a copper compound. The procedure may consist either in causing 1 mol of a compound of the above general formula to react in one operation with 2 mols of the compound containing a group capable of being vatted or by causing 1 mol of a compound of the above general formula to react first with 1 mol and then with a further mol of a compound containing a group capable of being vatted.

The vat-dyestuffs so obtained may be treated with a condensing agent, for example an acid or alkaline condensing agent, and/or with a substituting agent, for example a halogenating agent. There may be used as condensing agents for example sulfuric acid or an aluminium halide, if required in combination with or in presence of an alkali chloride, such as sodium chloride, or ammonia, an organic base, for example pyridine, or nitrobenzene, an acid chloride, for example benzoyl chloride, or an acid cyanide, for example benzylcyanide, or an alcoholate or a caustic alkali. In some cases the resulting products may be purified by the action of an oxidizing agent, such as an alkali nitrite in an acid medium or hypochlorite, or by vatting or by recrystallization. They may be converted by the usual methods into leuco derivatives, for example into leuco-sulfuric acid esters.

The products obtainable by the present invention constitute valuable new anthraquinone dyestuffs. They may be used for example for dyeing and printing various materials, for example, vegetable fibers, such as cotton and artificial silk or regenerated cellulose. Various shades are obtained which are of excellent fastness.

The following examples illustrate the invention, the parts being by weight unless otherwise stated and the relationship between parts by weight and parts by volume being that which exists between the kilo and the liter:

*Example 1*

14.5 parts of 1:3-dichloro-2-methyl-anthraquinone, 34.5 parts of 1:4-monobenzoyl-diaminoanthraquinone, 1 part of copper acetate, 20 parts of calcined sodium carbonate and 300 parts of naphthalene are heated together to boiling for 18 hours. The reaction mixture is then diluted at about 150° C. by addition of 300 parts of chlorobenzene and the reaction product is separated by filtering at 90–100° C., washed with chlorobenzene and freed from adherent chlorobenzene and from inorganic constituents by steam distillation and filtration. The new product of the probable formula

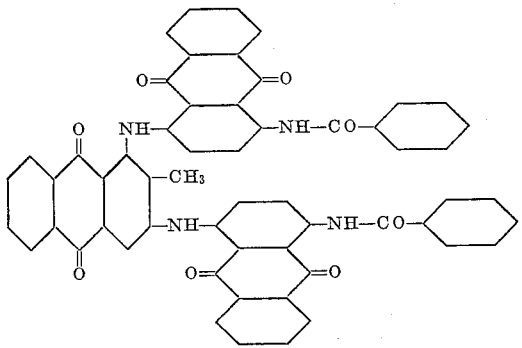

crystallizes in the form of needles and dissolves in concentrated sulfuric acid to a grass-green solution. It dyes cotton in a brown vat powerful and very fast grey shades.

Nitrobenzene may be used instead of chlorobenzene for diluting the reaction mixture.

When using instead of 1:3-dichloro-2-methyl-anthraquinone an equivalent quantity of 1:3-dichloro-2-ethyl-anthraquinone or 1:3-dichloro-2-propyl-anthraquinone, there are obtained similar dyestuffs.

*Example 2*

14.5 parts of 1:3-dichloro-2-methyl-anthraquinone, 34.4 parts of 1:5-monobenzoyl-diaminoanthraquinone, 40 parts of calcined sodium carbonate, 1 part of copper acetate and 300 parts of naphthalene are heated together to boiling for 18 hours, the reaction mixture is then diluted whilst still hot with 300 parts of chlorobenzene, the whole is filtered at 90–100° C. and the solid matter is washed with chlorobenzene and alcohol and then treated with boiling water, filtered and dried. The new dyestuff of the probable formula

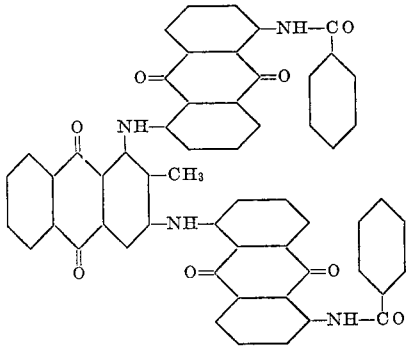

is soluble in concentrated sulfuric acid to a brown-olive solution. It dyes cotton in a brown vat very powerful and fast brown shades.

*Example 3*

14.5 parts of 1:3-dichloro-2-methyl-anthraquinone, 19.1 parts of chlorinated 1:2-phthaloyl-3-aminocarbazole, 20 parts of calcined sodium carbonate, 1 part of copper acetate and 300 parts of naphthalene are heated together to boiling for 3 hours. The whole is then allowed to cool somewhat, 17.2 parts of 1:4-monobenzoyl-diamino-anthraquinone are added to the melt and the whole is boiled for 18 hours longer and is then allowed to cool somewhat. It is then diluted with 300 parts of chlorobenzene and the reaction product is filtered at 90° C.

The resultant product dissolves in concentrated sulfuric acid to a grey-olive solution from which grey flakes are precipitated on pouring into water. It dyes cotton grey shades in a red-brown vat.

The chlorinated 1:2-phthaloyl-3-amino-carbazole used in this example is prepared by chlorinating 1:2-phthaloyl-3-benzoylaminocarbazole with sulfuryl chloride in nitrobenzene at 100° C. and saponifying the product. It crystallizes from nitrobenzene in the form of blue needles and melts above 300° C.

*Example 4*

60 parts of aluminium chloride are introduced at ordinary temperature into 300 parts of pyridine. During this operation the temperature rises to about 100° C. There are then added in several portions 20 parts of the dyestuff obtainable as described in Example 1 from 1:3-dichloro-2-ethylanthraquinone and 1:4-monobenzoyldiamino-anthraquinone and the whole is heated to boiling for 1½ hours. The melt is then poured whilst still hot into an alkaline sodium hydrosulfite solution, the whole is stirred for a short time and the leuco compound of the dyestuff is then oxidized by treatment with air and filtered. The dyestuff is soluble in concentrated sulfuric acid to a brown solution from which olive-green flakes are precipitated on pouring into water. It dyes cotton greenish-grey shades in a black-olive vat.

*Example 5*

20.5 parts of 1:3-dibromo-2-ethoxy-anthraquinone, obtainable for example by alkylation of 1:3-dibromo-2-hydroxyanthraquinone, 34.3 parts of 1:4-monobenzoyldiamino-anthraquinone, 20 parts of calcined sodium carbonate, 1 part of copper acetate and 350 parts of naphthalene are heated together to boiling for 18 hours. The reaction product is isolated by diluting the mixture with chlorobenzene and filtering. The new dyestuff of the probable formula

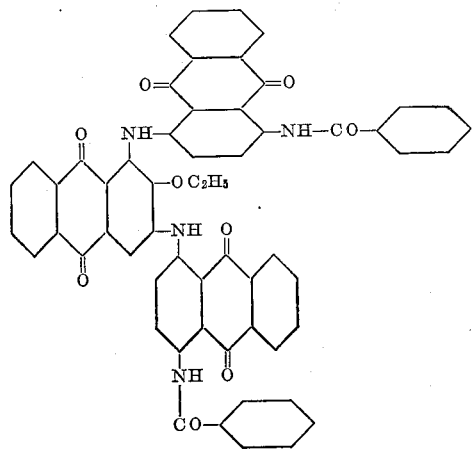

dissolves in concentrated sulfuric acid to an olive-green solution. It dyes cotton brown shades in a brown vat.

If 1:3-dibromo-2-methoxyanthraquinone is used instead of 1:3-dibromo-2-ethoxyanthraquinone there is obtained a dyestuff which dyes cotton grey shades in a violet-brown vat. This dyestuff is soluble in concentrated sulfuric acid to a grass-green solution.

*Example 6*

14.5 parts of 1:3-dichloro-2-methyl-anthraquinone, 44.5 parts of 5-amino-1:1'-anthrimide (obtained by reacting 1-chloro-5-benzoylaminoanthraquinone and 1-amino-anthraquinone and precipitation of the benzoyl group with concentrated sulfuric acid), 1 part of copper acetate, 40 parts of calcined sodium carbonate and 300 parts of naphthalene are heated together to boiling for 18 hours and the reaction product is isolated by diluting with chlorobenzene and filtering. It corresponds probably to the formula

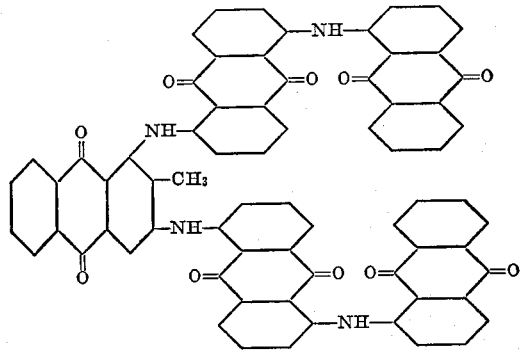

is soluble in concentrated sulfuric acid to a grey-green solution and dyes cotton reddish-grey shades in a red-brown vat.

*Example 7*

20 parts of the dyestuff obtainable as described in Example 6 are introduced into a melt of 300 parts of pyridine and 60 parts of aluminium chloride at about 100° C. and the whole is then heated to boiling for 1½ hours. The melt is then poured whilst still hot into an alkaline sodium hydrosulfite solution, the whole is stirred for a short time and the leuco compound of the dyestuff is oxidized by treatment with air and filtered. The dyestuff is soluble in concentrated sulfuric acid to a violet-brown solution and dyes cotton chocolate-brown shades in a yellow-brown vat.

What we claim is:

1. Process for the manufacture of vat-dyestuffs comprising condensing 1 molecular proportion of a compound of the general formula

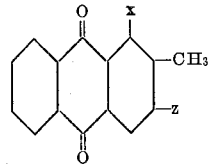

wherein $x$ and $z$ stand for one of the halogens chlorine and bromine, with 2 molecular proportions of 1-amino-4-benzoylaminoanthraquinone with elimination of 2 molecular proportions of hydrogen halide.

2. Products of the general formula

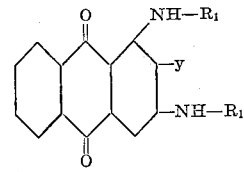

wherein $y$ stands for a member of the group consisting of —CH$_3$ and —OCH$_3$ and R$_1$ stands for a radical of a 4-benzoylaminoanthraquinone linked in the position 1 to the imino group.

3. The product of the formula

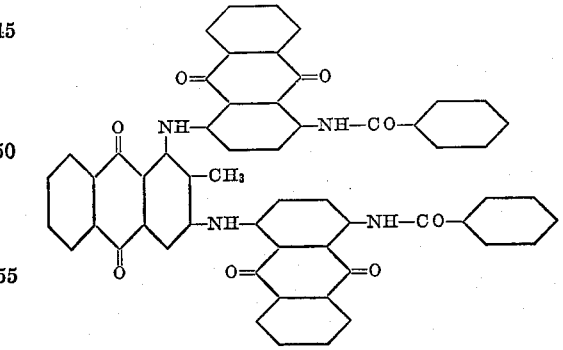

which dissolves in concentrated sulfuric acid to a grass-green solution and dyes cotton in a brown vat grey shades.

HERMANN HAUSER.
MAX BOMMER.